United States Patent
Covey et al.

(10) Patent No.: US 12,492,553 B2
(45) Date of Patent: Dec. 9, 2025

(54) EXTRUDABLE BUILDING MATERIAL WALL STRUCTURE AND METHOD

(71) Applicants: Samuel B. Covey, Austin, TX (US);
Charles R. Upshaw, Austin, TX (US);
Alexander Le Roux, Austin, TX (US);
ICON Technology, Inc., Austin, TX (US)

(72) Inventors: Samuel B. Covey, Austin, TX (US);
Charles R. Upshaw, Austin, TX (US);
Alexander Le Roux, Austin, TX (US)

(73) Assignee: ICON Technology, Inc., Austin, TX (US)

( * ) Notice: Subject to any disclaimer, the term of this patent is extended or adjusted under 35 U.S.C. 154(b) by 130 days.

(21) Appl. No.: 18/023,305

(22) PCT Filed: May 4, 2021

(86) PCT No.: PCT/US2021/030569
§ 371 (c)(1),
(2) Date: Feb. 24, 2023

(87) PCT Pub. No.: WO2022/026015
PCT Pub. Date: Feb. 3, 2022

(65) Prior Publication Data
US 2024/0011288 A1   Jan. 11, 2024

Related U.S. Application Data

(63) Continuation of application No. 16/943,728, filed on Jul. 30, 2020, now Pat. No. 11,572,692.

(51) Int. Cl.
*B33Y 10/00* (2015.01)
*B28B 1/00* (2006.01)
(Continued)

(52) U.S. Cl.
CPC ............... *E04B 2/84* (2013.01); *B28B 1/001* (2013.01); *B33Y 10/00* (2014.12); *B33Y 80/00* (2014.12);
(Continued)

(58) Field of Classification Search
None
See application file for complete search history.

(56) References Cited

U.S. PATENT DOCUMENTS 1,620,834 A    3/1927  Elmer
10,780,637 B2  9/2020  Chen-Iun-Tai
(Continued)

FOREIGN PATENT DOCUMENTS

CN   205 444 566 U   *   8/2016
CN   106760072 A       5/2017
(Continued)

OTHER PUBLICATIONS

Hijaz, Omar F., Final Office Action mailed Aug. 30, 2022 for U.S. Appl. No. 16/943,728.
(Continued)

*Primary Examiner* — Mohammad M Ameen
(74) *Attorney, Agent, or Firm* — KOKKA & BACKUS, PC

(57) ABSTRACT

A wall structure and a method for forming a wall structure is provided using three-dimensional printing of extruded building material applied to a surface of a building structure. According to one embodiment, the wall structure includes a pair of outer wythes spaced from an inner wythe. The outer wythes can include a core extending between the pair of outer wythes and toward the inner wythe. A protrusion can also extend toward the inner wythe a spaced distance from the inner wythe or entirely toward and adjoining the inner wythe. The core is configured with an inwardly facing
(Continued)

spaced opposed surfaces of the outer wythes surrounding a vertically extending rebar, with grout surrounding that rebar. Horizontally extending support pins can be spaced parallel from each other and extend from the protrusions and into the inner wythe.

20 Claims, 5 Drawing Sheets

(51) Int. Cl.
    *B33Y 80/00*     (2015.01)
    *E04B 1/16*     (2006.01)
    *E04B 1/35*     (2006.01)
    *E04B 1/76*     (2006.01)
    *E04B 2/84*     (2006.01)

(52) U.S. Cl.
    CPC ............. *E04B 1/16* (2013.01); *E04B 1/3505* (2013.01); *E04B 1/7604* (2013.01); *E04B 2103/02* (2013.01)

(56) References Cited

U.S. PATENT DOCUMENTS

| | | | |
|---|---|---|---|
| 10,851,538 | B2 | 12/2020 | Le Roux |
| 10,857,694 | B2 | 12/2020 | Chen-Iun-Tai |
| 11,572,692 | B2 | 2/2023 | Covey et al. |
| 2005/0196484 | A1 | 9/2005 | Khoshnevis |
| 2007/0138678 | A1 | 6/2007 | Khoshnevis |
| 2016/0130780 | A1 | 5/2016 | Castonguay et al. |
| 2020/0198318 | A1 | 6/2020 | Ford et al. |
| 2020/0282593 | A1* | 9/2020 | Le Roux ................ E04G 21/04 |
| 2022/0034088 | A1 | 2/2022 | Covey et al. |
| 2022/0081360 | A1 | 3/2022 | Kupwade-Patil et al. |

FOREIGN PATENT DOCUMENTS

| | | |
|---|---|---|
| CN | 111 379 360 A * | 7/2020 |
| CN | 111379359 A | 7/2020 |
| EP | 4189186 A1 | 6/2023 |
| KR | 102002829 B1 | 7/2019 |
| WO | 2022026015 A1 | 2/2022 |

OTHER PUBLICATIONS

Hijaz, Omar F., Non-Final Office Action mailed Apr. 25, 2022 for U.S. Appl. No. 16/943,728.

Hijaz, Omar F., Non-Final Office Action mailed Feb. 24, 2022 for U.S. Appl. No. 16/943,728.

Hijaz, Omar F., Notice of Allowance and Fee(s) Due mailed Oct. 4, 2022 for U.S. Appl. No. 16/943,728.

International Searching Authority, Notification of Transmittal of the International Search Report and Written Opinion of the International Searching Authority, or the Declaration for International Application No. PCT/US2021/030569 mailed Aug. 24, 2021 (11 pages).

* cited by examiner

EXTRUDABLE BUILDING MATERIAL WALL STRUCTURE AND METHOD

BACKGROUND

This disclosure is generally directed to three-dimensional printing of building structures. More particular, this disclosure is directed to printing of stacked layers of extrudable building material to form a wall structure of the building.

A building structure (e.g., building, dwelling, shed, home, etc.) may be manufactured with a multitude of different materials and construction methods. Among the materials commonly used in the construction of a building structure is concrete or cement. For example, cementitious material may be mixed with water and other dry ingredients to form the foundation and the interior or exterior walls of the building.

BRIEF SUMMARY OF THE DISCLOSURE

Some embodiments disclosed herein are directed to a construction system for constructing a building structure on ground, or on a pre-existing cement or concrete foundation. The construction system can include a printing assembly configured to deposit layers of extrudable or extruded building material to form the building. The construction system applies three-dimensional printing technology at a relatively large, building-structure scale. The construction system additively deposits construction material layer upon layer to form the walls of the building. The walls being formed can be either interior and/or exterior walls. Before or during the printing process, a cementitious mixture comprises the building material, which is then extruded from an outlet nozzle of the printing assembly as an elongated bead, layer by layer vertically upward to form the wall. The material properties of the cementitious mixture for three-dimensional printing must be of the proper viscosity and can include different dry ingredients such as portland cement, fly ash, limestone fines, silica fume, sand, gravel mixed with water and other fluid or liquid-based material.

The wall formed by additive three-dimensional printing technology is preferably one that includes at least an inner wythe and two or more outer wythes. A wythe can be considered as a continuous vertical section of cement or concrete one bead width in thickness. Within the wall structure and among the inner and outer wythes can be openings, such as window openings or door openings. For example, a pair of outer wythes of an outer wall structure may comprise a single wythe adjacent to another single wythe to increase its thickness and structural strength.

The construction system hereof is preferably configured to produce a wall structure having different configurations depending upon the location and orientation of an inner wythe relative to two or more outer wythes of that wall structure. Moreover, the wall structure can include additional supporting members, such as one or more cores and one or more protrusions spaced along the outer wythes. The core can be built with a substantially vertical rebar or other supporting metallic rod, and grout surrounding the rebar and bound between opposing inward-facing surfaces of a pair of outer wythes. The core can also be built with cable tension surrounded by grout or foam fill material. The protrusion can extend from, for example, one of a pair of outer wythes towards the inner wythe, and a pin that is substantially non-conductive to thermal energy can extend from within the protrusion to within the inner wythe. The combination of a vertical support member within the core and a substantially horizontal support member within the protrusion adds strength to the overall wall structure of the building formed by additive construction three dimensional printing technology.

According to one embodiment, the wall structure of the building can comprise an inner wythe including a first portion of a plurality of stacked elongated beads of extruded building material. The wall structure can further comprise a pair of outer wythes at least partially spaced from the inner wythe and including a second portion of the plurality of stacked elongated beads of extruded building material. The outer wythes can further include a core extending between the pair of outer wythes and toward the inner wythe a first spaced distance from the inner wythe. A protrusion can extend toward the inner wythe a second spaced distance from the inner wythe. According to an alternative embodiment, the protrusion is not spaced a second distance from the inner wythe, but instead can extend entirely toward and adjoins the inner wythe.

A thickness of the inner wythe is preferably one bead width of the first portion of the plurality of stacked elongated beads. The bead width is measured in a substantially horizontal plane, and the thickness of the inner wythe is the thickness of an elongated bead of the plurality of the stacked elongated beads. The thickness is measured orthogonal to the elongated axis of the elongated beads, and therefore is the thickness of the corresponding wythe. A thickness of at least a part of the outer wythes is two bead widths of the second portion of the stacked elongated beads. Accordingly, a thickness of the pair of outer wythes in at least a part of the outer wythes (outside portion of the wall structure) is two bead widths of the stacked elongated beads, one elongated bead laterally abutting the other elongated bead to form at least a part of the outer wythes.

Along the wall structure can be multiple protrusions and multiple cores. Each core is spaced from the other, and further spaced from a protrusion. Each protrusion is spaced from another protrusion and from a core. A core can be configured at a corner of the outer wythes, and specifically at a corner of a building. Moreover, a core can be configured at a vertically extending edge of a window or door opening of the building. When the elongated beads are stacked, each core is formed by opposing, spaced inside surfaces of stacked beads into which a vertical rod or rebar is placed and thereafter filled grout to surround the rebar to periodically add strength to the outer wythes. Strength is placed at the appropriate locations of the wall structure, specifically at the corner of the building, vertical edges of a door frame opening or window reveal opening, as well as periodically spaced distances along the outer wythes.

A protrusion extending from the inner wythe can accommodate a substantially horizontally extending first support pin extending from within that protrusion of, for example, a elongated bead of the plurality of stacked elongated beads into another elongated bead spaced therefrom but at a substantially co-planar position within the inner wythe and the outer wythes. As the elongated beads are additively placed, and therefore stacked upon each other, at some distance above the first support pin, a second support pin can be placed. The second pin can extend from within the protrusion of the outer wythes (preferably one wythe of the outer wythes) across the second spaced distance and into the inner wythe. The second support pin is therefore substantially parallel to and spaced from the first support pin possibly many layers above the first support pin into, for example, co-planar elongated beads or horizontally between pairs of stacked co-planar elongated beads.

According to a further embodiment, a method is provided for performing the wall structure of the building. In no particular order, the nozzle can be moved along the inner and outer wythes, possibly going from the inner wythe area to an outer wythes area as the wall structure is additively printed, layer-by-layer to form the inner and outer wythes, and also the cores and protrusions.

For example, the method can include moving a nozzle along an inner wythe area of the wall structure to partially form a first portion of an elongated bead. The nozzle can also move along an outer wythes area of the wall structure to partially form a second portion of the elongated beads substantially co-planar with the first portion. The nozzle can also be moved along a core region of the outer wythes area of the wall structure to continue partially forming the second portion of the elongated bead a first spaced distance from the inner wythe area. The nozzle can also be moved along a protrusion region of the outer wythe area of the wall structure to continue partially forming the second portion of the elongated bead a second spaced distance from the inner wythe area. After the inner and outer wythes of the wall structure is formed, including placement of the support pins and the support rod with grout, thermal insulation material can be placed between the inner wythe area and the outer wythe area. Alternatively, the insulation material can be printed at the same time each layer of the wythes are formed, layer-by-layer of insulation would be applied after each layer of the wythes are formed.

Embodiments described herein comprise a combination of features and characteristics intended to address various shortcomings associated with certain prior devices, systems, and methods. The foregoing has outlined rather broadly the features and technical characteristics of the disclosed embodiments in order that the detailed description that follows may be better understood. The various characteristics and features described above, as well as others, will be readily apparent to those skilled in the art upon reading the following detailed description, and by referring to the accompanying drawings. It should be appreciated that the conception and the specific embodiments disclosed may be readily utilized as a basis for modifying or designing other structures for carrying out the same purposes as the disclosed embodiments. It should also be realized that such equivalent constructions do not depart from the spirit and scope of the principles disclosed herein.

BRIEF DESCRIPTION OF THE DRAWINGS

For a detailed description of various exemplary embodiments, reference will now be made to the accompanying drawings in which.

DETAILED DESCRIPTION OF EXEMPLARY EMBODIMENTS

Figure 1:
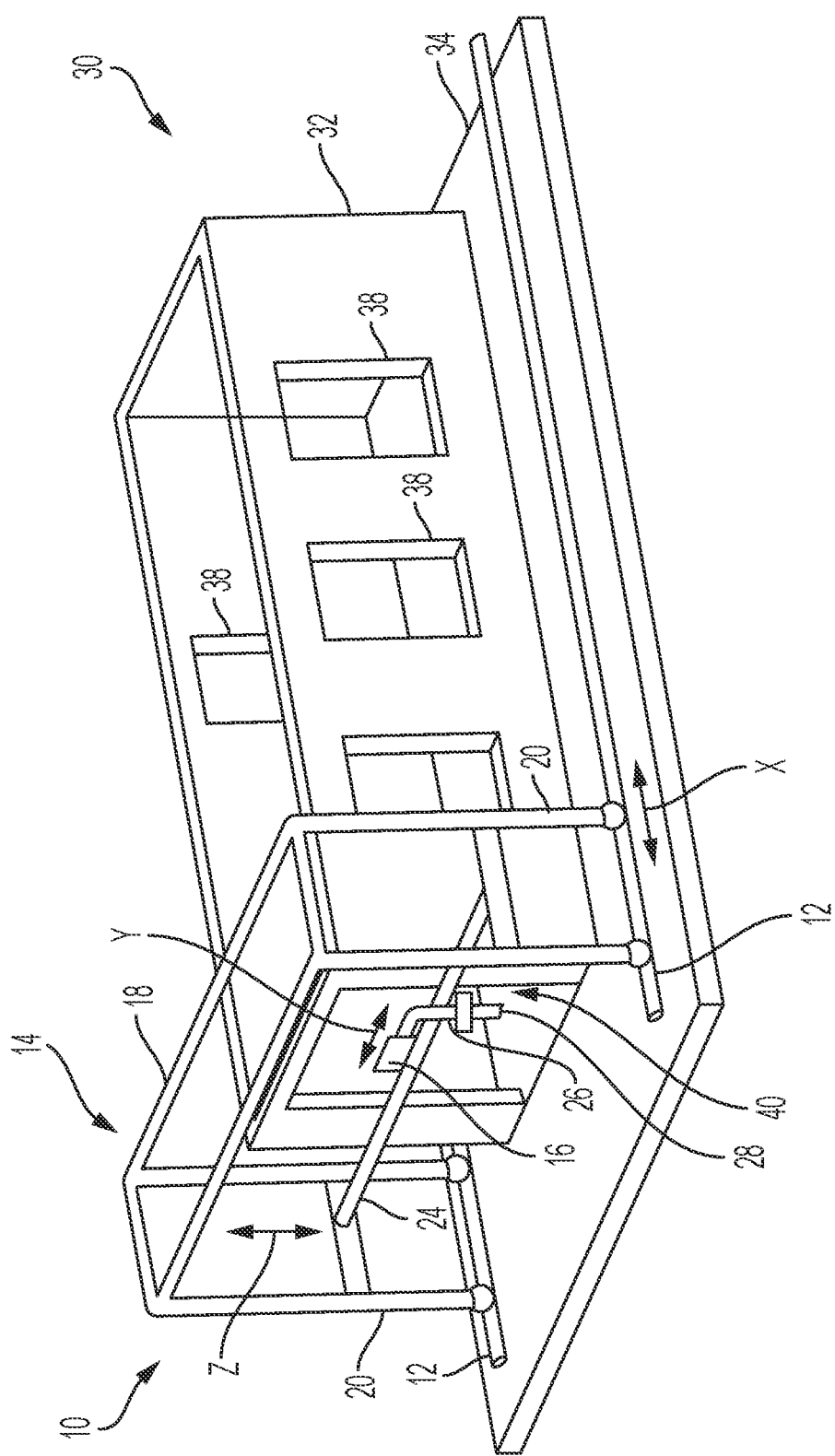
FIG. 1 is a perspective view of a construction system and a building structure being formed by the construction system using printed, stacked layers of elongated beads.

The following discussion is directed to various exemplary embodiments. However, one of ordinary skill in the art will understand that the examples disclosed herein have broad application, and that the discussion of any embodiment is meant only to be exemplary of that embodiment, and not intended to suggest that the scope of the disclosure, including the claims, is limited to that embodiment.

The drawing figures are not necessarily to scale. Certain features and components herein may be shown exaggerated in scale or in somewhat schematic form and some details of conventional elements may not be shown in interest of clarity and conciseness.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection of the two devices, or through an indirect connection that is established via other devices, components, nodes, and connections. In addition, as used herein, the terms "axial" and "axially" generally mean along or parallel to a given axis (e.g., x, y or z direction or central axis of a body, outlet or port), while the terms "radial" and "radially" generally mean perpendicular to the given axis. For instance, an axial distance refers to a distance measured along or parallel to the axis, and a radial distance means a distance measured perpendicular to the axis.

As used herein, the terms "about," "approximately," "substantially," "generally," and the like mean plus or minus 10% of the stated value or range. In addition, as used herein, an "extruded building material" refers to a building material that may be delivered or conveyed through a conduit (e.g., such as a flexible conduit) and extruded (e.g., via a nozzle or pipe) in a desired location. In some embodiments, an extruded building material includes a cementitious mixture (e.g., concrete, cement, etc.). Further, as used herein, the term "computing device" or "controller" refers to any suitable device (or collection of devices) that is configured to execute, store, and/or generate machine readable instructions (e.g., non-transitory machine readable medium). The term may specifically include devices, such as, computers (e.g., personal computers, laptop computers, tablet computers, smartphones, personal data assistants, etc.), servers, clients, etc. A computing device or controller may include a processor and a memory, wherein the processor is to execute instructions that are stored on the memory.

As previously described above, building structures (e.g., dwellings, buildings, sheds, etc.) may be manufactured with a multitude of different materials and construction methods. Traditionally, a building structure may be constructed upon a composite slab or foundation that comprises concrete reinforced with re-bar or other metallic materials. The structure itself may then be framed (e.g., with wood and/or metal framing members), and then an outer shell and interior coverings (e.g., ply-wood, sheet rock, etc.) may be constructed around the structural framing. Utilities (e.g., water and electrical power delivery as well as vents and ducting for air conditioning and heating systems) may be enclosed within the outer shell and interior covers along with insulation. This method of designing and constructing a building structure is well known and has been successfully utilized in constructing an uncountable number of buildings; however, it requires multiple constructions steps that cannot be performed simultaneously and that often require different skills and trades to complete. As a result, this process for designing and constructing a building can extend over a considerable period (e.g., 6 months to a year or more) and is somewhat labor-intensive. Such a lengthy construction period is not desirable in circumstances that call for the inexpensive construction of a structure in a relatively short period of time.

Accordingly, embodiments disclosed herein include construction systems, methods of construction, and even methods for structure design that allow a building structure to be constructed in a fraction of the time associated with traditional construction methods. In particular, embodiments disclosed herein utilize additive manufacturing techniques (e.g., three dimensional (3D) printing) in order to produce a building more quickly, economically, and in a systematic manner. Three dimensional printing generally involves movement of a printing assembly, and a nozzle outlet of the printing assembly, in three axes of movement across a horizontal surface of a wall structure comprising inner and outer members. The wall structure is therefore built layer-by-layer from the ground or foundation upward. As the wall is being built, or printed, the nozzle will periodically turn off and extruded building material will cease exiting the outlet to leave openings in the wall for the windows, doors, etc.

Referring to FIG. 1, a construction system 10 according to one embodiment is shown. Although there are multiple types of 3D additive construction systems contemplated herein, one example of a construction system 10 includes a gantry-type construction system. Construction system 10 can include a pair of railed assemblies 12, a gantry 14 moveably disposed on rail assemblies 12, and a printing assembly 16 moveably disposed on gantry 14. For example, gantry 14 can include a bridge support 18 connected between a pair of vertical supports 20. Also, coupled between vertical supports can be a trolly bridge 24, on which printing assembly is 16 is moveably disposed.

For example, gantry 14 can move in the x-axis or x direction along rail assemblies 12, and printing assembly 16 can move along the y-axis or y direction along trolly bridge 24. To complete the three orthogonal axes or dimensions of movement for printing assembly 16, trolly bridge 24 can move vertically up and down along the z-axis. For example, trolly bridge 24 can move up and down in the z-axis upon the vertical support members 20. The x-axis is orthogonal to the y-axis and the z-axis is orthogonal to the plane formed by the x and y axes. Movement along the x, y and z-axes of printing assembly 16 can occur via drive motors coupled to drive belts, chains, cables, etc. Controllably from an instruction-driven processor within a peer system or controller.

Construction system 10 effectuates the construction of a building structure 30 by passing the printing assembly 16 above a wall structure 32 and emitting extruded building material from a nozzle 26 comprising an outlet 28. Accordingly, as printing assembly 16 moves in three possible orthogonal axis, as well as angles therebetween, outlet 28 emits extruded building material onto the upper surface of the wall structure 32 as it is being formed. The wall structure is formed layer-by-layer by laying down an elongated bead of cementitious material of cement or concrete beginning with the first layer on ground or a pre-existing foundation 34.

As each layer of elongated beads are laid down onto the foundation 34 or onto a previous layer, a plurality of stacked elongated beads of extruded building material additively, and three dimensions, form a building structure 30. When the printing assembly 16, and thereby the outlet 28 approaches an opening, such as a window opening 38, or a door opening 40, the pump for the extruded building material stops, and possibly a valve on nozzle 28, or elsewhere, shuts off the flow of extruded material, and does not resume the flow until after the outlet 28 moves past the opening where the wall structure 32 is resumed.

Foundation 34 can be made of concrete with metallic rods (e.g., rebar) within the foundation form. Alternatively, foundation 34 can simply be ground, possibly packed gravel or crushed rock, etc. Importantly, however, foundation 34 upper surface should be substantially planar at its top surface and of sufficient perimeter size to accommodate 3D printing of wall structure 32 thereon. The axis, labeled as x, y and z are orthogonal axis in three dimensions; however, it is contemplated that printing assembly 16 and thus outlet 28 can move in three dimensions to form a wall structure at various three-dimensional angles that can be but need not be orthogonal angles for the outer and inner wall structures 32. Accordingly, while FIG. 1 shows an outer wall structure 32, it is possible to form an inner wall structure to bifurcate rooms of a building 30 using the construction system 10.

Figure 2:
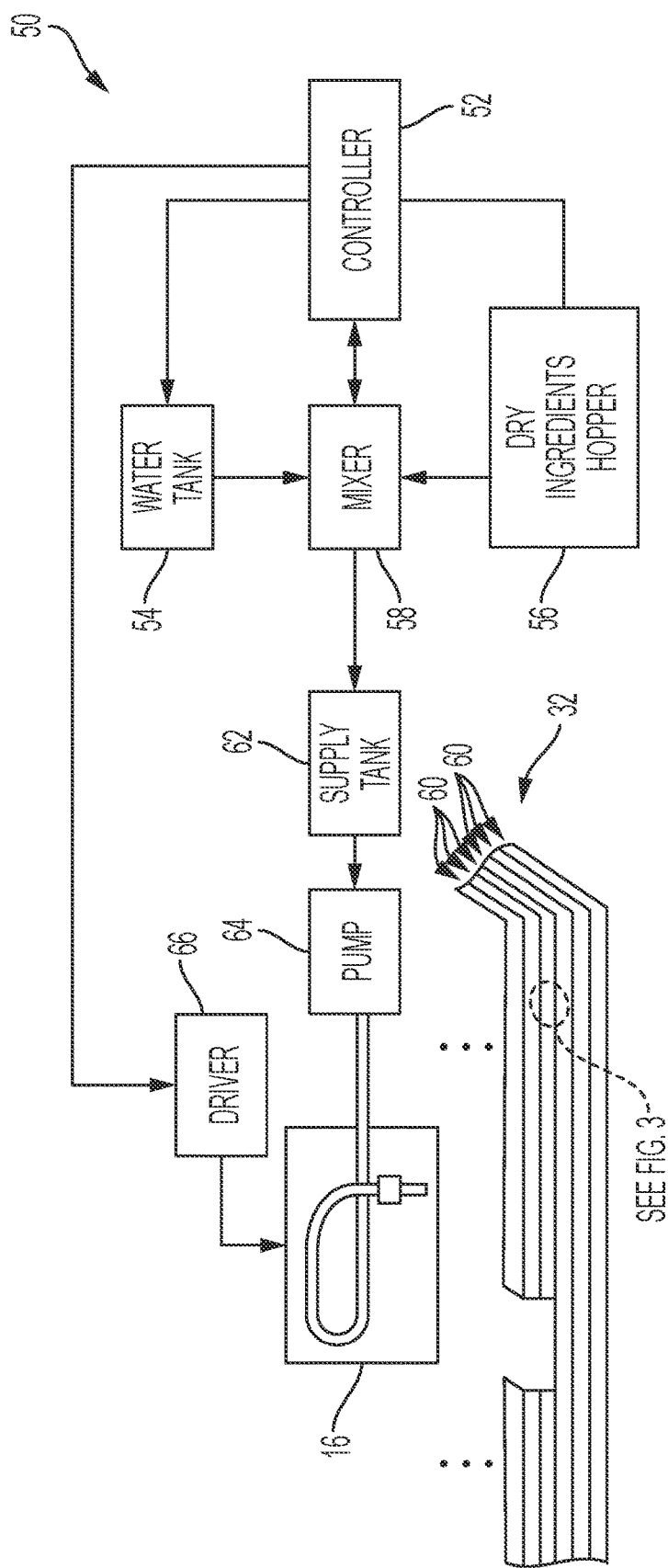
FIG. 2 is a partial front view of the structure, and a block diagram of a control system for controlling the printing of stacked beads that form the wall structure by moving a printing assembly above and along an upper surface of the wall structure, and by supplying a proper mixture and flow of extruded building material along the upper surface of the wall structure.

Referring to FIG. 2, a control system 50 is shown in block diagram for controlling the printing of the stacked elongated beads 60 of wall structure 32. Control system 50 includes a computer system, or controller 52, that contains memory and an instruction set for adding the proper amount of water or liquid mix material from water tank 54, and dry ingredients from hopper 56 into mixture 58. Possibly through a feedback sense mechanism, controller can adjust the mix of the concrete material and thus the proper proportions of water (or liquid) to dry material, and supply that proper mix to a supply tank 62.

It is desirable for the stacked elongated beads to be at the proper cross-sectional dimension which is approximately 2.5 inches in lateral width (i.e. parallel to the horizontal plane) and approximately 1 to 2 inches tall. (i.e. perpendicular to the horizontal plane). The horizontal plane is preferably along a plane formed by the x and y axes, and the orthogonal dimension thereto is preferably along the z-axis or dimension. To maintain the proper cross-sectional dimension in the horizontal plane so that when the elongated beads are stacked, the inner and outer surfaces are relatively even in texture and somewhat smooth. Pump 64 can be used to supply the proper volume of extruded material to supplement the proper viscosity from mixer 58. Controller 52 thereby controls not only the proper flow and viscosity of the elongated bead as it is being printed, one on top of the other, but controller 52 also controls movement of the printing assembly 16 in the x, y and z dimensions via driver 66. The driver can be a motor coupled to any drive mechanism that moves the corresponding trolly bridge 24, gantry 14 and printing assembly on the trolly bridge 24 according to the instruction CAD layout, and to the proper speed, established by the instructions stored in controller 52.

Figure 3:
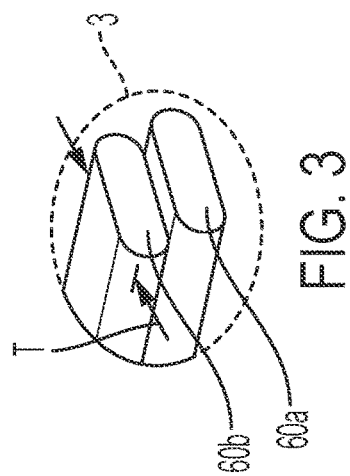
FIG. 3 is expanded breakaway view along region 3 of FIG. 2, showing the elongated beads of the wall structure that, when stacked, form a single wythe or multiple wythes inner or outer wall members, respectively, of the wall structure.

Turning now to FIGS. 2 and 3 in combination, FIG. 3 illustrates an expanded breakaway view along region 3 of FIG. 2. Specifically, FIG. 3 illustrates the elongated beads stacked on top of one another to form a plurality of vertically stacked elongated beads 60. In the example shown, elongated bead 60b is stacked upon elongated bead 60a. As the printing process continues, another elongated bead will be stacked upon bead 60b, and so on. If one bead is stacked upon another bead, then the ensuing wall structure 32 will be one bead width in thickness, labeled T. As noted above, a wythe is a continuous plurality of vertically stacked elongated beads, and a wythe can be a single wythe of thickness T, or a multiple wythe of multiple thicknesses T depending how many elongated beads are placed adjacent one another during the printing process. Accordingly, a wythe is only one bead width in thickness, whereas a pair of wythes is two bead thickness possibly with a core area spaced between a portion of the pair of wythes.

Figure 4:
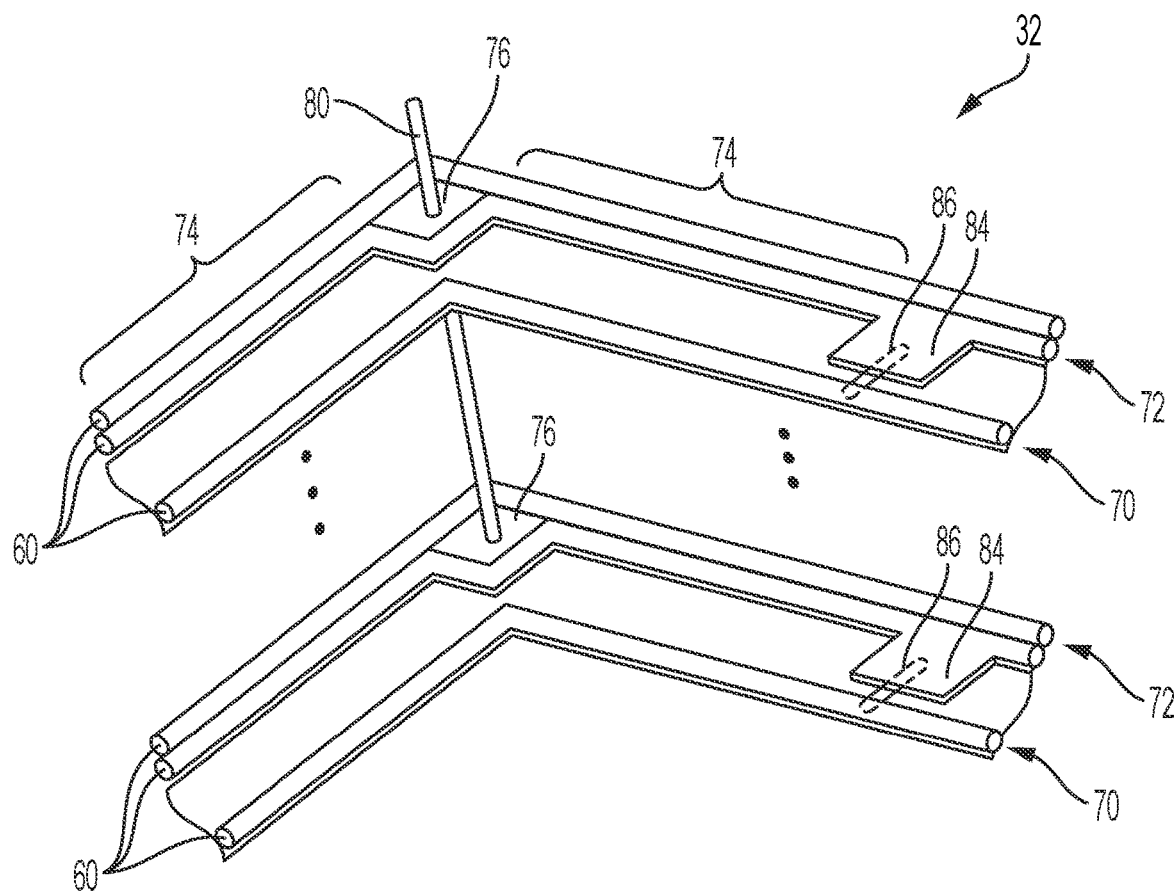
FIG. 4 is a top perspective view of multiple layers of elongated beads, each formed with at least one core and at least one protrusion for providing support for the wall structure.

Referring now to FIG. 4, a top perspective view of a wall structure 32 is shown. For sake of clarity and brevity in the drawing, only two layers of the present wall structure 32 is shown. However, it is appreciated that multiple layers have stacked elongated beads 60 that form the ensuing wall structure 32. FIG. 4 illustrates in further detail two portions of wall structure 32, primarily inner wythe 70, and outer wythes 72. Distinction between inner and outer wythes 70 and 72 is drawn from the difference of whether the corresponding wythe faces the inside of the building or the outside of the building. The inside of the building or the inner member of the wall in which, for example, the inhabitants reside, is where the inner surface of the inner wythe 70 faces. The outside elements of the building would thereby face an outer surface of the outer wythes 72. Because of the greater forces exerted by the outside environment, the outer wythes 72 of wall structure 32 may require additional support relative to the inner wythe 70.

As shown in FIG. 4, a thickness of at least a part of the pair of outer wythes 72 can include two bead widths in thickness, and that part is labeled as part 74. Conversely, because inner wythe 70 need not maintain as much strength as the outer wythes 72, inner wythe 70 is shown as having a thickness of one bead width. Outer wythes 72 further include a core 76 extending toward the inner wythe 70. Core 76 can be configured at a corner of the outer wythes 72, or at a corner of the building. Moreover, the core can include a substantially vertically extending support rod 80 that extends perpendicular through an opening of each layer of elongated beads, one spaced from the other in a generally square or rectangle shaped opening. Core 76 is therefore shaped between a pair of laterally spaced, preferably square orientation, elongated beads that form the outer wythes 72. As each layer of elongated beads 60 is formed, with the corresponding opening of core 76 being formed, a substantially vertical support rod, of a metallic or non-metallic (basalt, glass fiber, carbon fiber) rebar 80 is placed. To maintain rebar 80 in its proper position and to give strength to the core 76, an elongated (in the vertical dimension) square opening that surrounds the inserted rod 80 is then filled with grout 75 (as shown in FIG. 5), or any other cementitious or concrete material, including possibly non-cementitious material such as rigid foam products, etc.

Similar to core 76, a protrusion 84 extends from each layer of the outer wythe and can be printed during the formation of the outer wythes, and specifically the laterally inward elongated bead 60 of the outer wythes 72. Protrusion 84 extends towards the inner wythe either the same spaced distance from the inner wythe as the core, or at a different spaced distance. For example, the core can extend toward the inner wythe a first spaced distance that is less than the second spaced distance at which the protrusion 84 extends from the inner wythe 70. Protrusion 84 is formed by printing an elongated bead within a protrusion region of the outer wythes 72, inward toward the inner wythe 70 then a spaced parallel and co-planar distance from the inner wythe 70 alongside but not touching the inner wythe 70, and then orthogonally away from the inner wythe 70 central axis. Similar to core 76, protrusion 84 is formed by printing elongated beads in a different yet co-planar axis than, for example, part 74 of outer wythe 72.

Periodically, as protrusion 84 is formed, a support pin 86 is placed. For example, after protrusion 84 is printed by moving the nozzle along the x-axis and then changing direction to the y-axis, back to the x-axis and then changing again to the negative y-axis and then back to the x-axis to form protrusion 84, pin 86 is placed across the upper surface of the protrusion 84, across a second spaced distance separating the inner and outer wythes, and upon the co-planar elongated bead of the inner wythe 70. Thereafter, when the next layer of stacked elongated beads are placed on the inner and outer wythes 70 and 72, and specifically in the protrusion region 84, the support pin 86 is effectively and securely embedded within protrusion 84 and within inner wythe 70, with the middle portion of pin 86 exposed in the second spaced distance between the inner and outer wythes 70 and 72. Support pin 86 is preferably made of a low thermal conductive material, such as plastic, fiber reinforced plastic, fiberglass, carbon fiber, or any rigid non-conductive material. However, since rod 80 of core 76 is embedded within grout of the outer wall, rod 80 can be made of a relatively high thermal conductive material, such as metal. As will be noted below, the space between the inner and outer wythes 70 and 72 will be subsequently filled with a thermally insulative material 77 (as shown in FIG. 5) to reduce the thermal transmissivity from the outer environment to the inner environment, and vice versa. Maintaining low thermal conduction at pin 86 helps maintain low thermal conduction in the space between the outer wythe 72 and the inner wythe 70. This configuration significantly minimizes thermal bridging from the outer wythes to the inner wythes while maintaining structural integrity. The discontinuous structural columns and protrusions connected by non-conductive pins enhances the structural soundness yet also increases the thermally insulative capacity of the 3D printed wall structure.

Figure 5:
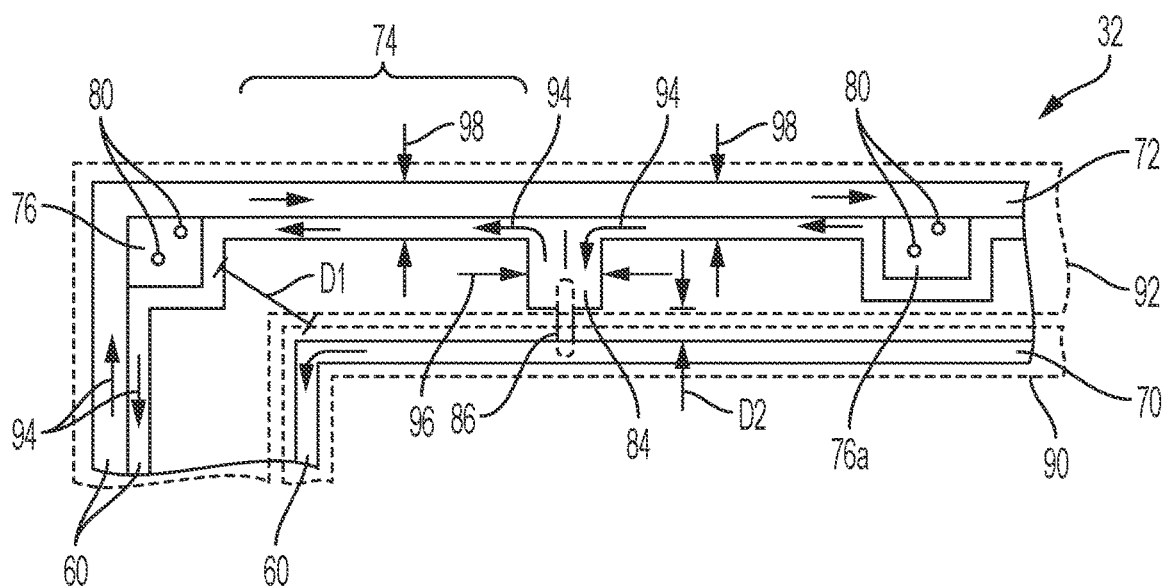
FIG. 5 is a top view of the wall structure showing a pair of outer wythes spaced from an inner wythe and supported by one or more cores and protrusions.

Turning now to FIG. 5, a top view of wall structure 32 is shown having the outer wythes 72 spaced from the inner wythe 70. The inner wythe 70 incudes a first portion 90 of a plurality of stacked elongated beads 60. As the first portion 90 of the elongated beads 60 are placed, to form the inner wythe 70, the outer wythes 72 are formed in a second portion 92 of the plurality of stacked beads. Each layer of the elongated beads 60 are stacked layer-by-layer, and the portion residing in the inner wythe 70 is denoted as a first portion 90 of stacked elongated beads, whereas the portion within the outer wythes is denoted as the second portion 92 of the same plurality of elongated beads 60 albeit in the outer wythes area rather than in the inner wythe area. The printed beads are therefore printed in different areas that form the wall structure, and if printed in the inner wythe 70, those beads are in a first portion 90, whereas the same beads may also reside in the outer wythes 72 as second portion 92. When formed, the elongated beads 60 are stacked upon each other thereby forming the inner wythe 70 in the first portion 90 while also forming the outer wythes 72 in the second portion 92.

As shown in FIG. 5, the inner and outer wythes 70 and 72, respectively, are printed along an elongated axis possibly in the direction show in arrows 94, layer-by-layer to form the inner wythe 70 and the outer wythes 72. The protrusion 84 can be formed possibly when printing the innermost bead of the pair of outer wythes 72 along the direction of the arrows 94. The protrusion 84 can therefore be two bead widths in thickness 96. Thickness 96 of protrusion 84 is measured parallel to a central axis of the inner wythe 70 and a central axis of the outer wythes 72. A part 74 of the outer wythes 72 is two bead widths in thickness 98, wherein part 74 and is substantially equal to the spacing between core 76 and protrusion 84. The two bead widths in thickness of part 74 is measured at locations between core 76, second core 76a, etc. as well as between core 76 and protrusion 86 and is equivalent to two bead widths that laterally abut one another along the horizontally extending axis parallel in part to a central axis of the second portion 92 of the plurality of stacked elongated beads 60.

Core 76, as well as all other cores 76a, b, c, etc. are spaced from core 76 and extend between the pair of outer wythes 72 and toward the inner wythe 70. According to the embodiment shown in FIG. 5, core 76, as well as all other spaced cores 76a, etc. extend toward the inner wythe 70 a first spaced distance D1 from the inner wythe 70. Protrusion 84 also extends towards the inner wythe 70 a second spaced distance D2 from the inner wythe 70. A first spaced distance D1 and the second spaced distance D2 are not shown to scale in FIG. 5, and can be the same as or different from each other. Moreover, depending on where the core 76 is placed, the first spaced distance D1 can be different among cores 76. For sake of brevity in the drawings, two cores 76 and 76a are shown, along with a single protrusion 84. However, it is understood that depending on the length of the outer wythes 72, there certainly can be and most likely would be more than two cores and certainly more than one protrusion therebetween. Depending on the needed structural integrity and strength of the outer wythes 72, and the overall wall structure 32 configuration, there can be numerous cores 76 spaced from each other, as well as numerous protrusions 84 interspersed among the cores 76 and extending inward from the outer wythes towards the inner wythe from the outer wythes 72 and towards the inner wythe 70.

Figure 6:
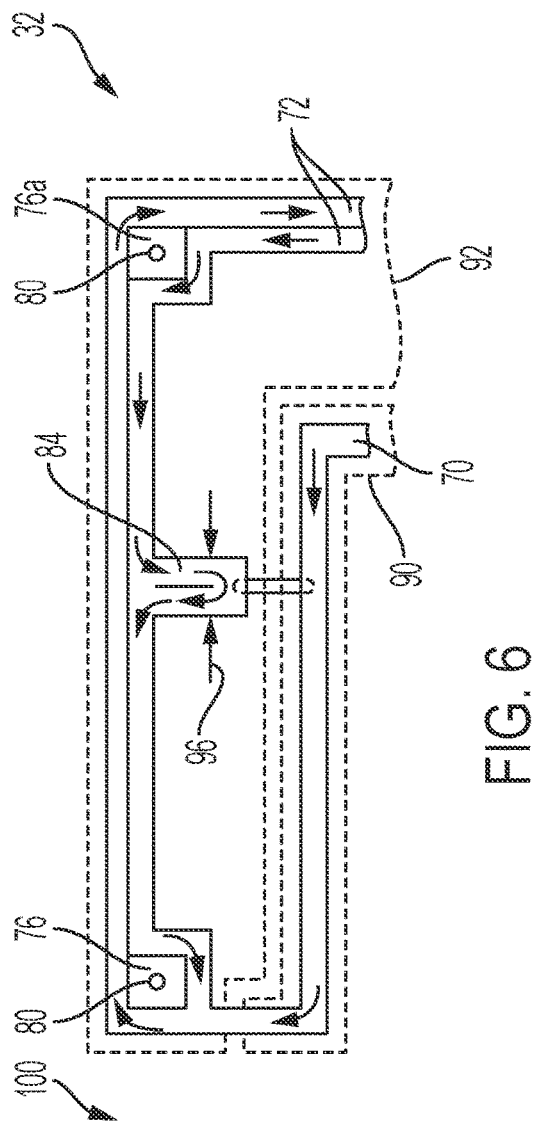
FIG. 6 is a top view of the wall structure having a window or door opening and illustrating the vertically extending cores forming a support on opposite sides of the door or window opening.
Figure 6:
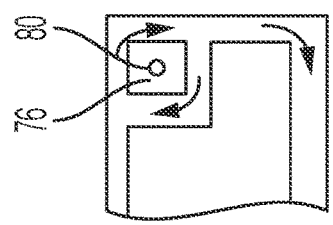

FIG. 6 is a top view of wall structure 32 showing a window or door opening 100. Preferably, at the outer corner of the window or door opening 100, and at both opposing outer corners of opening 100, is a pair of cores 76. Core 76 is therefore configured not only at the corner of a building, but also at the corner of outer wythes 72 at the vertically extending edge of a window or door opening 100. Since the outer wythes 72 are stacked, and core 76 extends between pair of outer wythes 72, a vertically extending opening (vertical as measured perpendicular to the ground foundation upper planar surface) cores 76 can be filled with grout around a single or multiple vertically extending support rods 80. The pair of outer wythes 72 confine the grout as it is poured into the opening of core 76 thereby surrounding the vertically extending support rod or rods 80 and thereby increasing the strength of the wall structure 32 primarily at areas where strength is needed such as window and door-jambs, periodically along the outer wythes 72 and also at the corner of the building.

Figure 7:
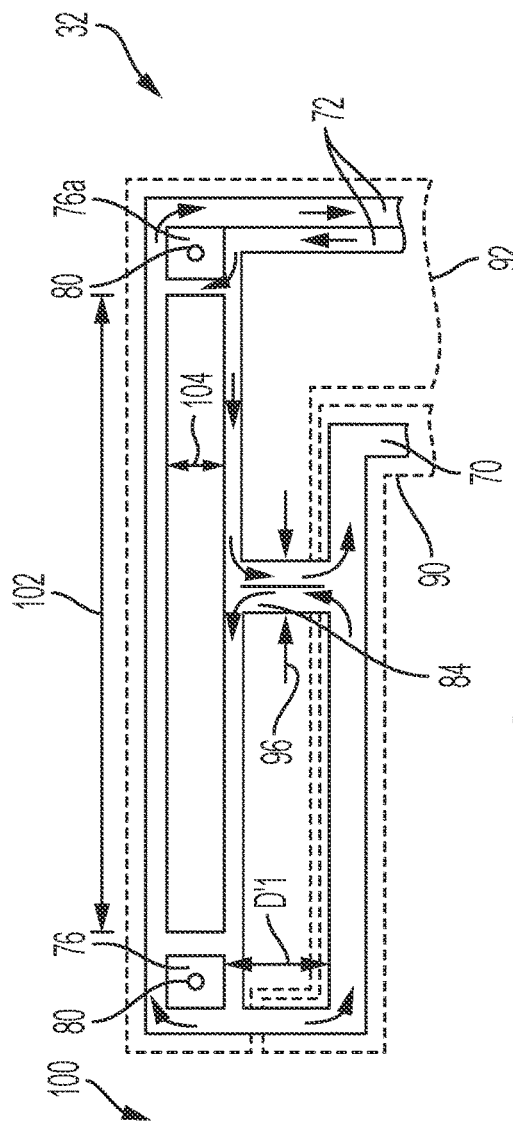
FIG. 7 is a top view of the wall structure according to an alternative embodiment.
Figure 7:
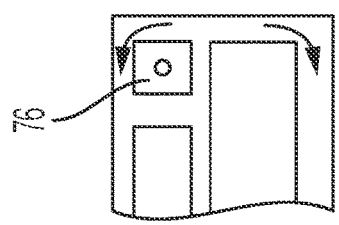

FIG. 7 is a top view of the wall structure 32 according to an alternative embodiment. Similar to the embodiment shown in FIG. 6, wall structure 32 in FIG. 7 includes an inner wythe 70 and a pair of outer wythes 72. Moreover, the inner wythe includes a first portion of a plurality of stacked elongated beads, and the outer wythes 72 includes a second portion 92 of the plurality of the stacked elongated beads. The outer wythes 72 are at least partially spaced from the inner wythe 70, and the outer wythes 72 include a core 76 extending between the pair of outer wythes and towards the inner wythe a first spaced distance D'1 from the inner wythe 70. Protrusion 84, unlike the first embodiment, is shown in the second embodiment of FIG. 7 as extending entirely toward and adjoining the inner wythe 70. Similar to protrusion 84 shown in FIG. 6, protrusion 84 shown in FIG. 7 can have a thickness 96 of approximately two bead widths.

The outer wythes 72 of FIG. 7 can be spaced from each other along a first length 102. The thickness of a first length 102 of the outer wythes 72 between core 76 and a second core 76a spaced from core 76 and along the outer wythes 72 is essentially equal to a width of the core 76 and the second core 76a. Accordingly, the embodiment shown in FIG. 7 is somewhat similar to the embodiment of FIG. 6 with the exception that protrusion 84 extends entirely towards and adjoins the inner wythe 70, and the outer wythes 72 can be spaced from each other between cores, that space is shown as reference numeral 104.

After the inner and outer wythes 70 and 72 are formed, an insulation material of low thermal conductivity can be inserted between the inner and outer wythes 70 and 72, including insertion into the first and second spaced distances D1 and D2 of the first embodiment. Insulation material can also be inserted into a space between the inner and outer wythes 70 and 72, including the first spaced distance D'1 as well as the spaced distance 104 between the pair of outer wythes 72 as shown in the second embodiment of FIG. 7. Any form of low thermal conductivity insulation material can be used, a preferred form would be an injectable liquid that would harden as a form insulation with low or minimal expansivity as it hardens and dries. One such material could be InsulSmart™ foam insulation.

Figure 8:
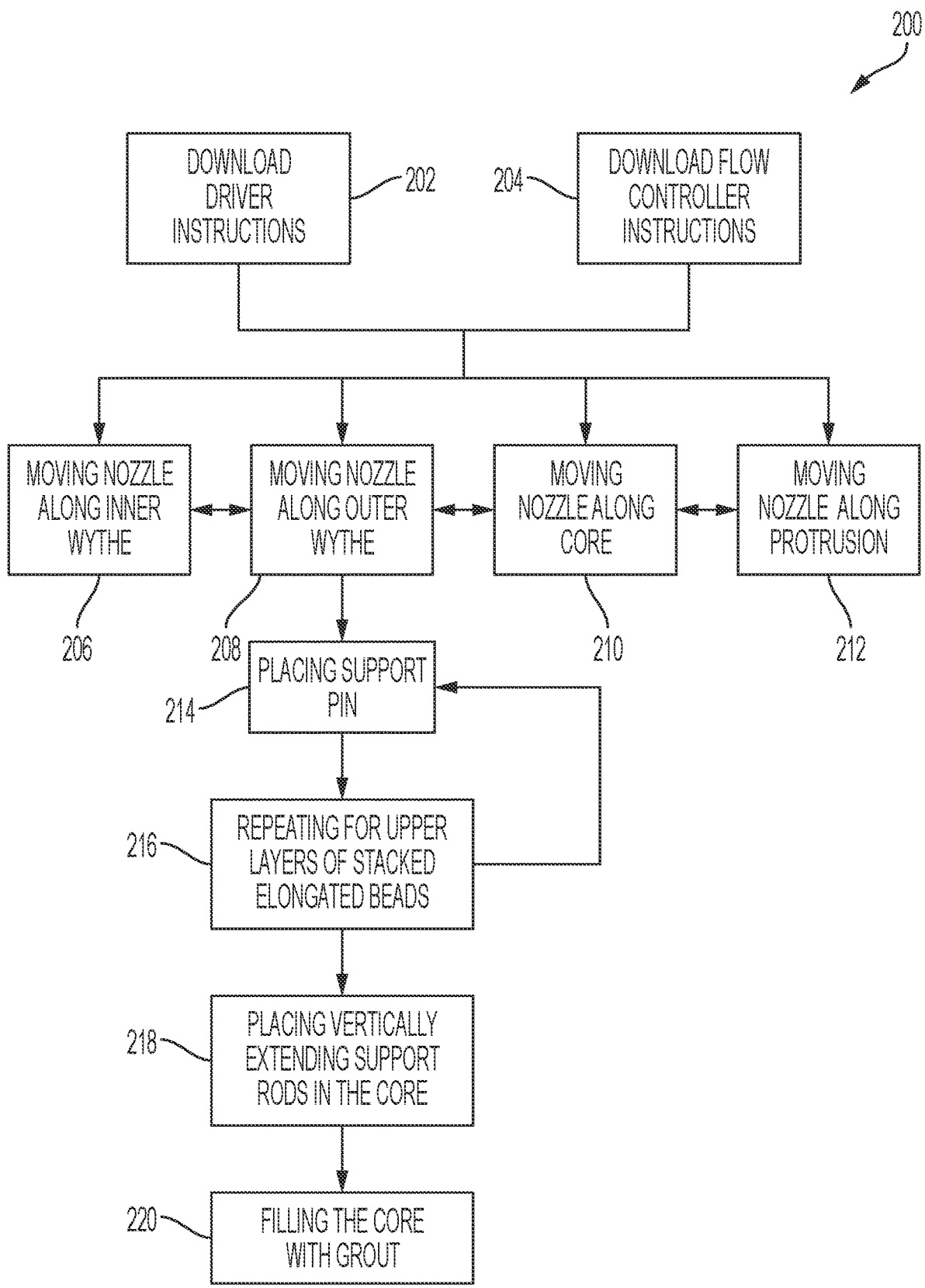
FIG. 8 is a flow diagram of a method for forming a wall structure according to one embodiment.

Referring now to FIG. 8, a flow diagram 200 is shown of a method for forming the wall structure according to one embodiment. The method includes downloading driver instructions 202 as well as flow controller instructions 204 into memory of a 3D building construction system. From those downloaded instructions, a controller having a processor can supply signals to extrude materials from a printing assembly using various flow controllers such as valves, mixers, and supply pump mechanisms. The controller also can actuate drivers on the constructions system, including drivers for the gantry, trolly bridge etc. to move the printing assembly in various axis or dimensions above the wall structure area.

In no particular order, the method includes moving the printing assembly nozzle along the inner wythe area of the wall structure to partially form a first portion of an elongated bead 206. A nozzle can also be moved along a pair of outer wythes area of the wall structure to partially form a second portion of the elongated beads substantially co-planar with the first portion 208. The nozzle can also be moved along a core region of the outer wythes area of the wall structure to continue partially forming the second portion of the elongated bead a first spaced distance from the inner wythe area 210. The nozzle can still further be moved along a protrusion region of the outer wythes area of the wall structure to continue partially forming the second portion of the elongated bead a second spaced distance from the inner wythe area 212.

A support pin can be placed across the protrusion as well as across the co-planar inner wythe, and specifically across the different portions of the elongated bead which form the inner wythe and the protrusion. The process can be repeated in any order while periodically placing a support pin across the protrusion region and the inner wythe area 216.

After the stacked layers of beads are formed in the second portion to complete the inner walls of the core, one or more vertically extending support rods can be placed in the core 218. The core can then be filled with grout, thereby surrounding the support rod with grout that extends between the support rod and the inner wall of the core as shown reference 220. Preferably, grout is a mixture of water, cement and sand, and the support rod is preferably rebar, such that when the grout hardens the overall strength of the wall structure at the core is significantly increased. Among other areas where there is any space or gap between the inner and outer wythes areas, a thermal insulation material is placed to reduce thermal conductivity between the outer environment and the inner regions of the building.

While exemplary embodiments have been shown and described, modifications thereof can be made by one skilled in the art without departing from the scope or teachings herein. The embodiments described herein are exemplary only and are not limiting. Many variations and modifications of the systems, apparatus, and processes described herein are possible and are within the scope of the disclosure. Accordingly, the scope of protection is not limited to the embodiments described herein, but is only limited by the claims that follow, the scope of which shall include all equivalents of the subject matter of the claims. Unless expressly stated otherwise, the steps in a method claim may be performed in any order. The recitation of identifiers such as (a), (b), (c) or (1), (2), (3) before steps in a method claim are not intended to and do not specify a particular order to the steps, but rather are used to simplify subsequent reference to such steps.

What is claimed is:

1. A method of forming a wall structure of a building, comprising:
    moving a nozzle along an inner wythe area of the wall structure to partially form a first portion of an elongated bead;
    moving the nozzle along a pair of outer wythes area of the wall structure to partially form a second portion of the elongated bead substantially co-planar with the first portion;
    moving the nozzle along a core region of the outer wythes area of the wall structure to continue partially forming the second portion of the elongated bead a first spaced distance from the inner wythe area; and
    moving the nozzle along a protrusion region of the outer wythes area of the wall structure to continue partially forming the second portion of the elongated bead into a protrusion disposed a second spaced distance from the inner wythe area, a support pin being placed coplanar and integrally between the protrusion and the inner wythe area.

2. The method of claim 1, further comprising:
    repeating in any order said moving the nozzle along the inner wythe area, outer wythes area, core region and protrusion region while periodically placing the support pin across the protrusion region and the inner wythe area.

3. The method of claim 1, further comprising:
    placing a substantially vertically extending support rod within the core region; and
    surrounding the support rod with grout to the outer edges of the core region.

4. The method of claim 1, further comprising flowing a thermal insulation material between the inner wythe area and the outer wythes area.

5. The method of claim 1, further comprising:
    downloading driver instructions into a memory of a 3D building construction system.

6. The method of claim 1, further comprising:
    supplying signals from a processor to a printing assembly, the printing assembly including the nozzle, to extrude materials from the nozzle to form the first portion of the elongated bead or the second portion of the elongated bead.

7. The method of claim 1, further comprising:
    accessing a memory and an instruction for adding liquid mix material from a water tank to dry ingredients from a hopper to form a mixture to be extruded from the nozzle.

8. The method of claim 1, further comprising:
    accessing a memory and an instruction for adding water material from a water tank to dry ingredients from a hopper to form a mixture to be extruded from the nozzle.

9. The method of claim 1, further comprising:
    adjusting a mixture of water and dry material based on feedback from a feedback sense mechanism, to form a mixture to be extruded from the nozzle.

10. The method of claim 1, wherein the pair of outer wythes area includes an outer wythe with an outside surface that faces outside elements of the wall structure of the building.

11. The method of claim 1, wherein moving the nozzle along the core region of the outer wythes area of the wall structure includes moving the nozzle along a corner of the outer wythes area, such that the core is positioned in between the second portion of the elongated bead and another elongated bead.

12. The method of claim 1, further comprising:
    forming a protrusion substantially at the protrusion region, the protrusion being part of a wythe of the pair of outer wythes area.

13. The method of claim 1, further comprising:
    forming a protrusion substantially at the protrusion region, the protrusion being part of the pair of outer wythes area, such that the protrusion extends from the pair of outer wythes area toward the inner wythe area.

14. A method of forming a wall structure of a building, comprising:
    moving a nozzle along an inner wythe area of the wall structure to partially form a first portion of an elongated bead by extruding a cementitious mixture from the nozzle;
    moving the nozzle along an outer wythe area of the wall structure to partially form a second portion of the elongated bead by extruding a cementitious mixture from the nozzle, such that the inner wythe area and the outer wythe area are spaced a distance apart; and
    moving the nozzle along a protrusion region of the outer wythe area of the wall structure to form a protrusion spaced another distance from the inner wythe area, a support pin being disposed coplanar and integrally between the protrusion and the inner wythe area.

15. The method of claim 14, further comprising:
repeating in any order said moving the nozzle along the inner wythe area, outer wythe area, and protrusion region; and
placing the support pin across the protrusion and coupled to the protrusion.

16. The method of claim 14, wherein the protrusion extends from the protrusion region of the outer wythe area and adjoins the inner wythe area with the outer wythe area.

17. The method of claim 14, further comprising:
additively placing elongated beads on top of one another by repetitively moving the nozzle along the inner wythe area, the outer wythe area, and the protrusion region, and by extruding the cementitious mixture from the nozzle to form the elongated beads; and
placing the support pin across the protrusion, such that the support pin extends from within the protrusion across the spaced distance between the inner wythe area and the outer wythe area and from the elongated bead of the inner wythe area into the elongated bead of the outer wythe area.

18. The method of claim 14, further comprising:
moving the nozzle along a core region of the outer wythe area of the wall structure to continue partially forming the second portion of the elongated bead a second spaced distance from the inner wythe area;
placing a substantially vertically extending support rod within the core region; and
surrounding the support rod with grout to the outer edges of the core region.

19. The method of claim 14, further comprising:
accessing a memory and an instruction for adding liquid mix material from a water tank to dry ingredients from a hopper to form a mixture to make the cementitious mixture to be extruded from the nozzle.

20. The method of claim 14, further comprising:
downloading driver instructions and flow controller instructions in a memory of a 3D building construction machine.

* * * * *